March 21, 1967 W. C. HOFFMAN 3,310,750
VOLTAGE GENERATOR PROVIDING FIRST AND SECOND
OFFSET CARRIER SWEEPS
Filed June 10, 1964 6 Sheets-Sheet 1

INVENTOR.
WILLIAM C. HOFFMAN,
BY J. K. Haskell
ATTORNEY.

March 21, 1967 W. C. HOFFMAN 3,310,750
VOLTAGE GENERATOR PROVIDING FIRST AND SECOND
OFFSET CARRIER SWEEPS
Filed June 10, 1964 6 Sheets-Sheet 4

United States Patent Office 3,310,750
Patented Mar. 21, 1967

3,310,750
VOLTAGE GENERATOR PROVIDING FIRST AND SECOND OFFSET CARRIER SWEEPS
William C. Hoffman, Hawthorne, Calif., assignor to Hughes Aircraft Company, Culver City, Calif., a corporation of Delaware
Filed June 10, 1964, Ser. No. 373,997
6 Claims. (Cl. 328—72)

This invention relates to voltage generators.

A voltage generator according to the present invention is characterized by first means for receiving two signal voltages; second means coupled to the first means and responsive to first and second signal voltages having respective first and second waveforms respectively representative of equal amplitude sine and cosine functions of an angle continuously varying with time between predetermined limits for providing first and second sweep carrier voltages returning to a predetermined reference level before the beginning of each successive sweep thereof and respectively having envelopes bearing the same relationship to each other as the first and second waveforms, for further providing a first offset sweep carrier voltage representative of the algebraic sum of a first offsetting voltage proportional to the second signal voltage and a sweep carrier voltage having an envelope and a reference level substantially identical to the first sweep carrier voltage, and for still further providing a second offset sweep carrier voltage representative of the algebraic sum of a second offsetting voltage proportional to the first signal voltage and a sweep carrier voltage having an envelope and a reference level substantially identical to the second sweep carrier voltage; and third means coupled to the second means for applying the first and second sweep carrier voltages and the offset sweep carrier voltages to a utilization device.

One use for such a voltage generator is to develop orthogonal deflection voltages for scanning write and erase beams in a cathode ray storage tube of the kind described in U.S. Patents 3,089,055 and 3,089,056. When thus utilized, the generator, in response to two signal voltages representative of equal amplitude sine and cosine functions of an angle continuously varying with time between predetermined limits, provides constant, predetermined, parallel-offset tracking between the locus of the erase beam and the locus of the write beam as the latter shifts or rotates across the storage target. This is advantageous in that it permits selective line-by-line erasure parallel to and spatially immediatelly preceding the new writing and thereby improves the dynamic ranges of the cathode ray tube for either storage or display. In terms of display, this means an improved range of gray tones, hence better effective resolution. By way of contrast, the tracking provided by a fixed horizontal bias in PPI modes is not constant in the amount of offset between the two scan loci as they rotate, and if a constant angular offset is used instead, it results in overlap at the scanning vertex because of difficulties in keeping a pair of electron beam guns in registration. Angular offset also results in different intensities of background illumination and hence different degrees of effective resolution at opposite ends of each write scan.

Another advantage of a voltage generator according to the present invention is that the frequency of the signal voltages required at the input is relatively low, hence, the generator may be used at a substantial distance from the signal voltage source without serious signal degradation due to distributed capacitive and inductive reactance on the lines between the source and the generator.

The above-mentioned and other features of the present invention will best be understood from the following description of exemplary embodiments thereof taken in conjunction with the accompanying drawings in which like characters refer to like parts, and wherein:

FIG. 1 is a block diagram of a voltage generator provided in accordance with one embodiment of the present invention;

FIG. 2 is a block diagram of another voltage generator provided in accordance with a second embodiment of the present invention showing, in addition to the voltage generator itself, a signal voltage source in block diagram form and partly in block form and partly in perspective, portions of a utilization device to which the output voltages of either the voltage generator of FIG. 1 or that of FIG. 2 may be applied;

Figure 2:
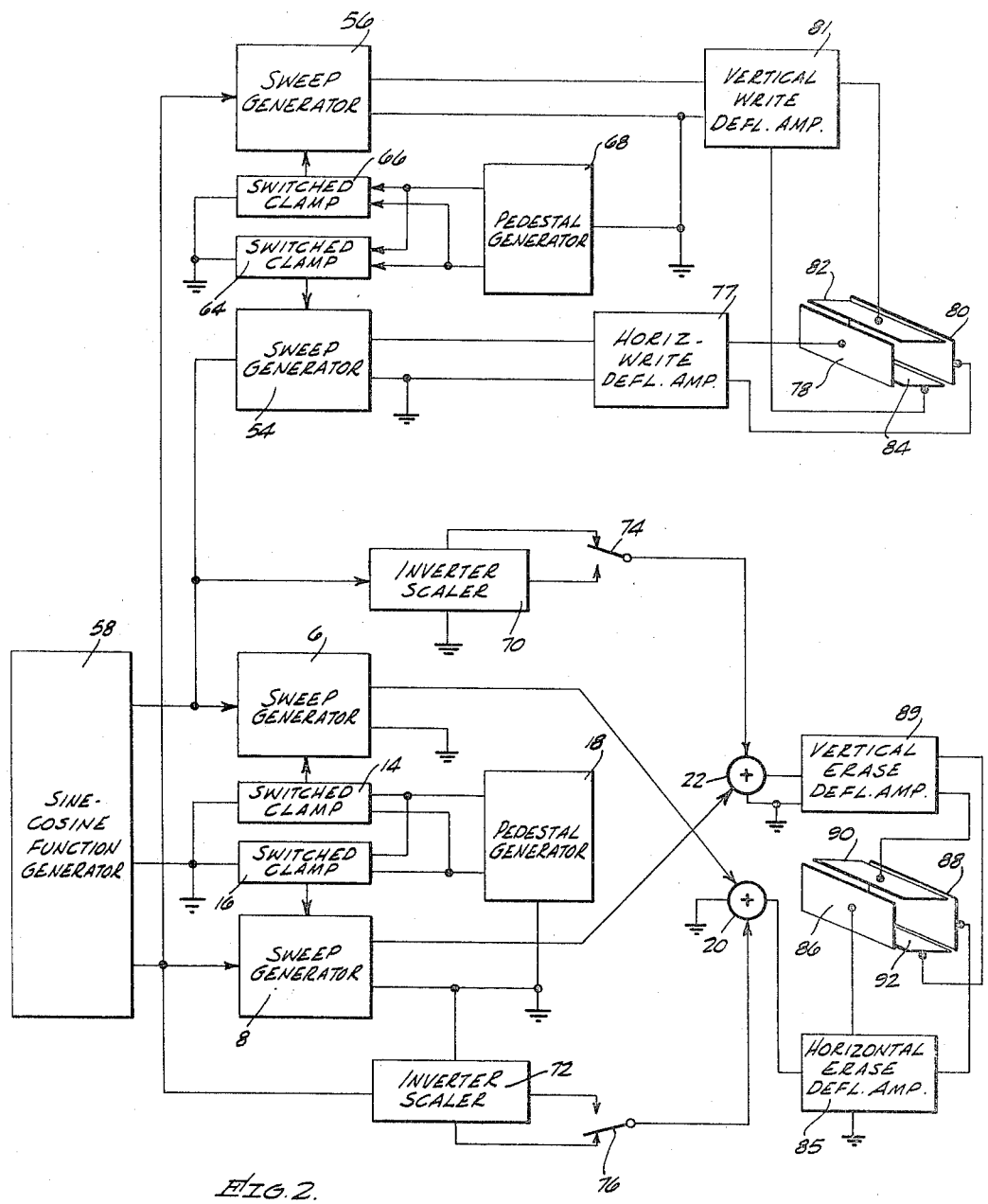
Figure 8:
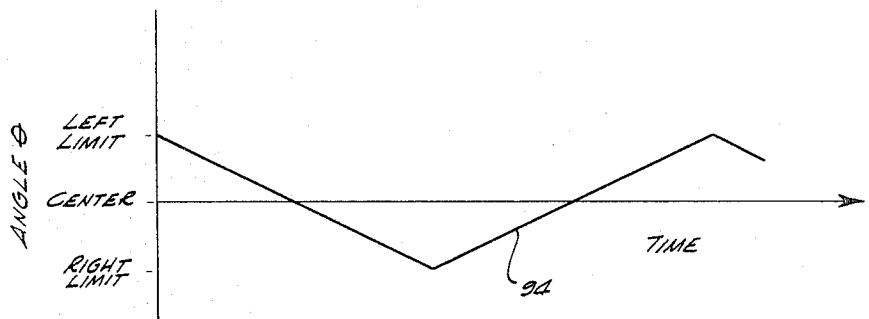
Figure 9:
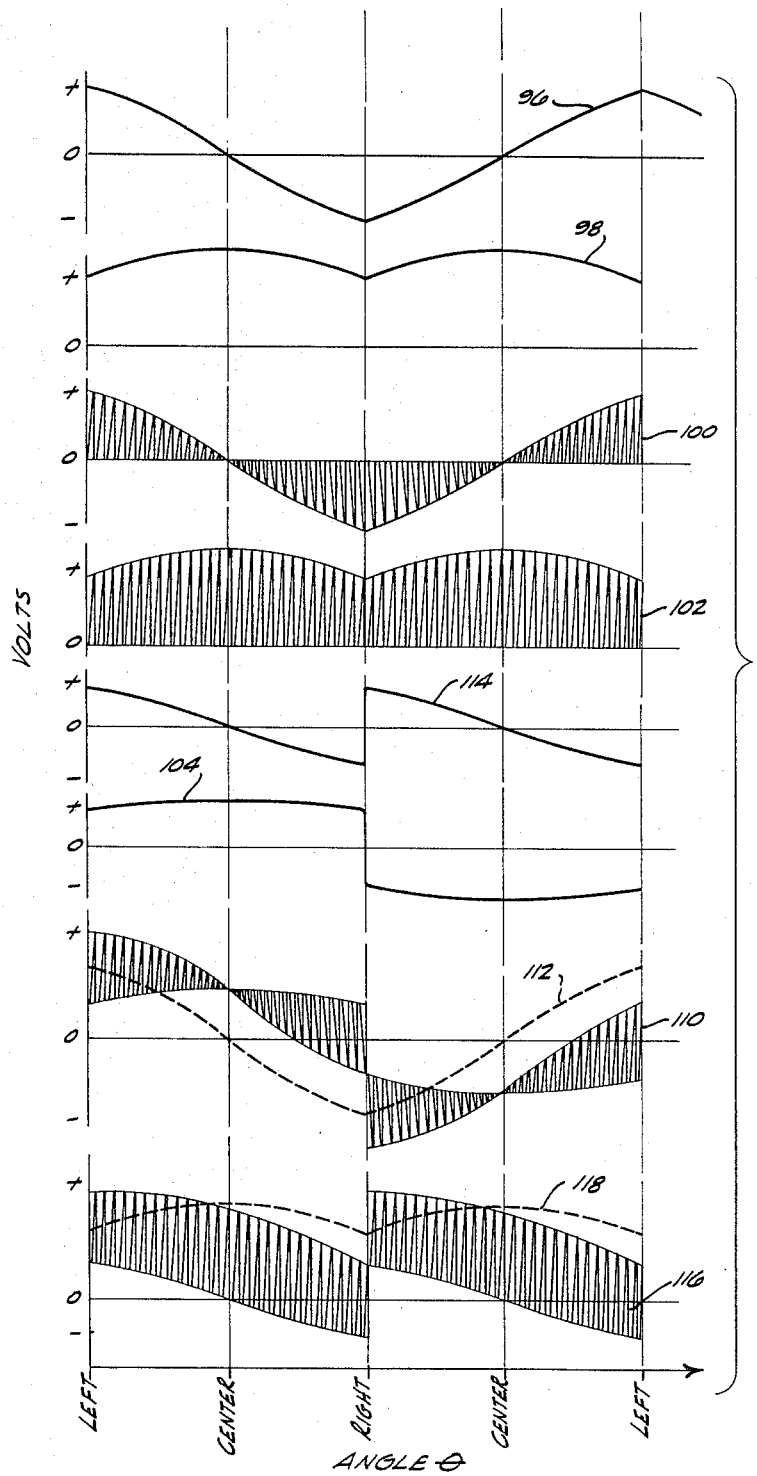

FIG. 8 is a graph of a linear function of time such as an angle between the direction of view of a radar antenna and co-planar reference direction, the angle varying uniformly back and forth between predetermined finite equal limits on either side of a reference; and FIG. 9 is a graph of voltage waveforms at various points in the voltage generator according to the embodiment of FIG. 2 utilized for sector PPI operation in a cathode ray storage tube.

Figure 1:
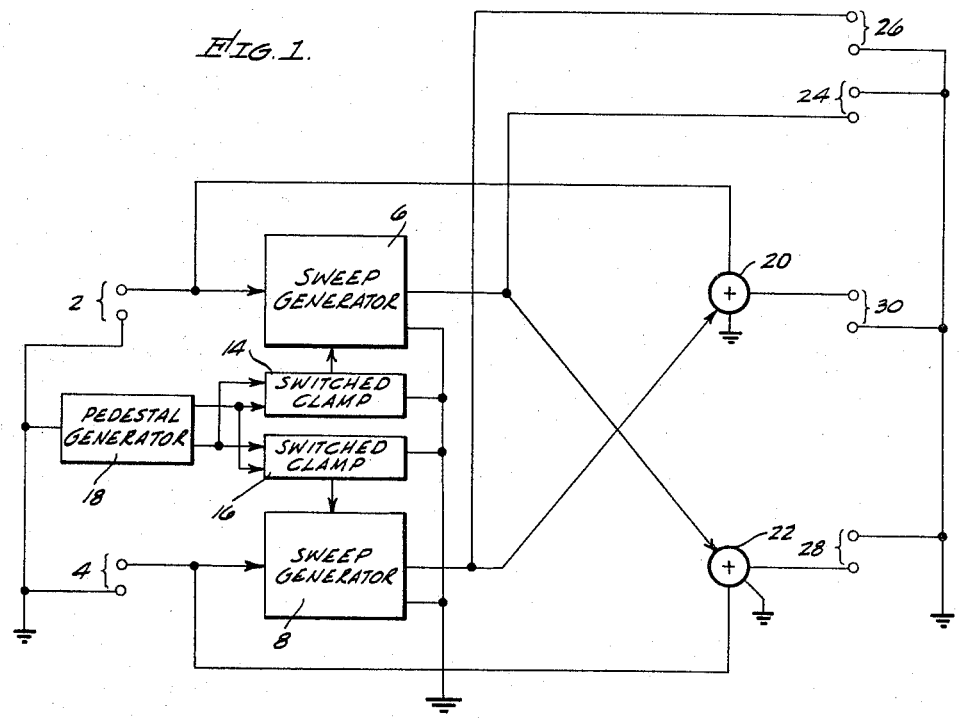

Referring now to FIG. 1, first and second terminal pairs 2, 4 are shown for receiving signal voltages one member of each pair being coupled to a point of fixed reference potential, such as, in this case, ground. Also shown are first and second sweep generators 6, 8 respectively coupled to the first and second terminal pairs 2, 4. Each of the sweep generators 6, 8 may comprise a combination of passive network elements, such as, referring to FIG. 5, a resistor 10 and a capacitor 12 in series, the input being applied across the combination and the output taken across the capacitor. Other types of sweep generator may also be used, one such being a Miller integrator, which comprises a combination of passive and active elements (not shown). Miller integrators are described in Millman and Taub, Pulse and Digital Circuits, pp. 216–228, McGraw-Hill, 1956.

Figure 5:
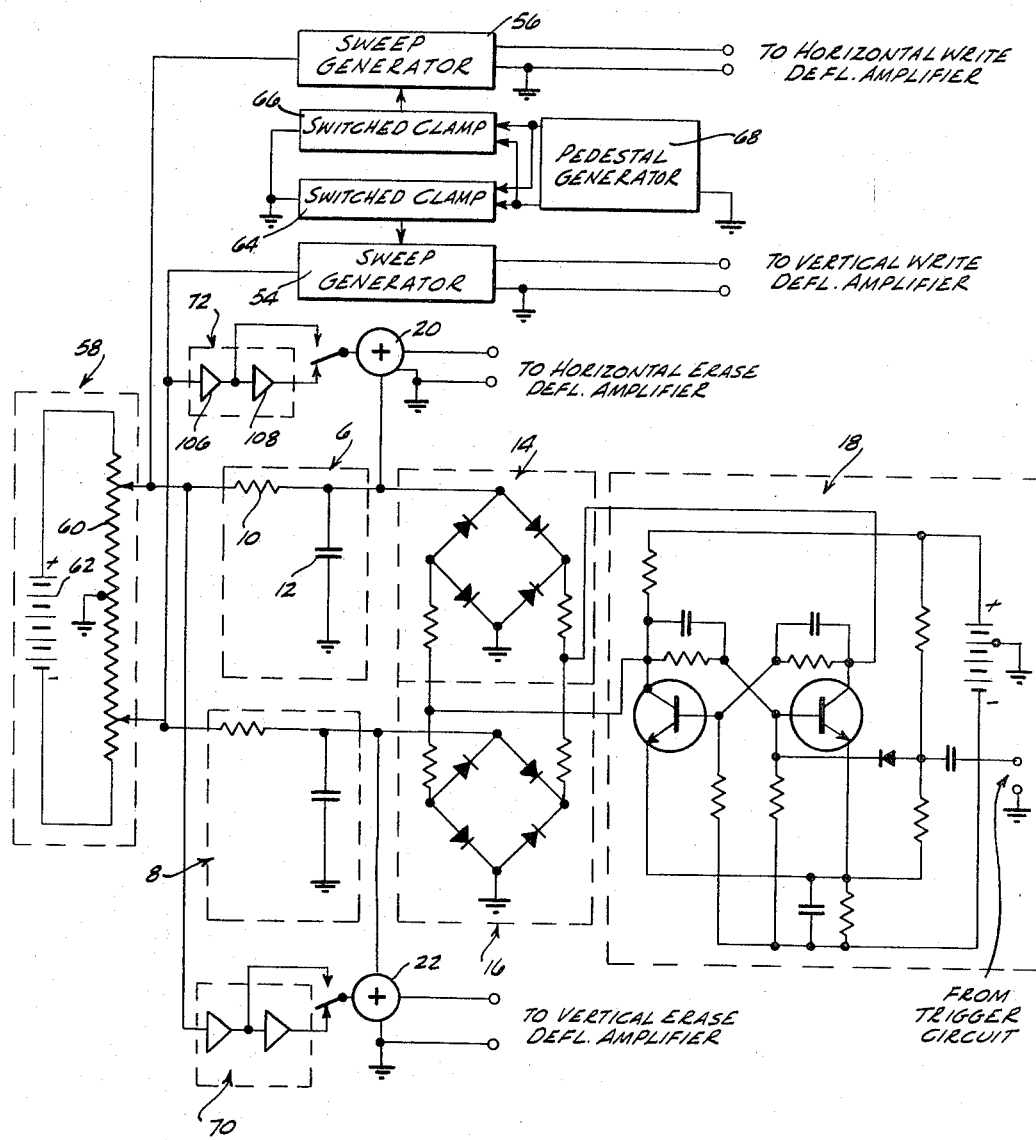
FIG. 5 is in part a circuit diagram and in part a block diagram of a voltage generator according to the embodiment shown in FIG. 2.

Coupled to the first and second sweep generators 6, 8 respectively, are first and second switched clamps 14, 16. Driven by a pedestal generator 18 to which they are coupled, the switched clamps 14, 16 may be of the diode bridge type shown in FIG. 5. The operation of switched clamps and a description of other types of switched or synchronous clamps which may also be used may be found in the section entitled "Synchronous Clamping" in Millman and Taub, op. cit., pp. 126–127. The pedestal generator 18 may be a conventional monostable multivibrator as shown in FIG. 5, or it may be a bistable or astable multivibrator depending on the type of triggering desired or available and the sweep timing desired.

Continuing to refer to FIG. 1, a first summing means 20, which may be a summing network, is coupled to the first sweep generator 6 and the second terminal pair 4 and a second summing means 22 is coupled to the second sweep generator 8 and the first terminal pair 2. Third, fourth, fifth and sixth terminal pairs 24, 26, 28, 30 are respectively coupled to the first sweep generator 6, the second sweep generator 8, the first summing means 20, and the second summing means 22 for applying their respective output voltages, to be described below, to a utilization device.

Figure 6:
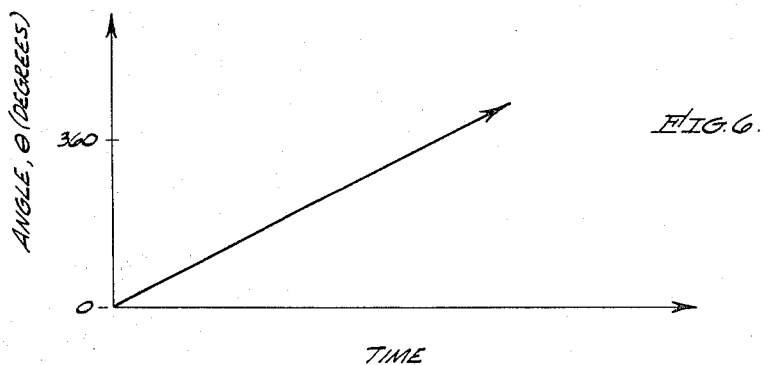
FIG. 6 is a graph of a linear function of time such as an angle between the direction of view of a radar antenna and a co-planar reference direction, the angle constantly varying between predetermined limits of zero and infinity as by uniform uni-directional rotation of the antenna.
Figure 7:
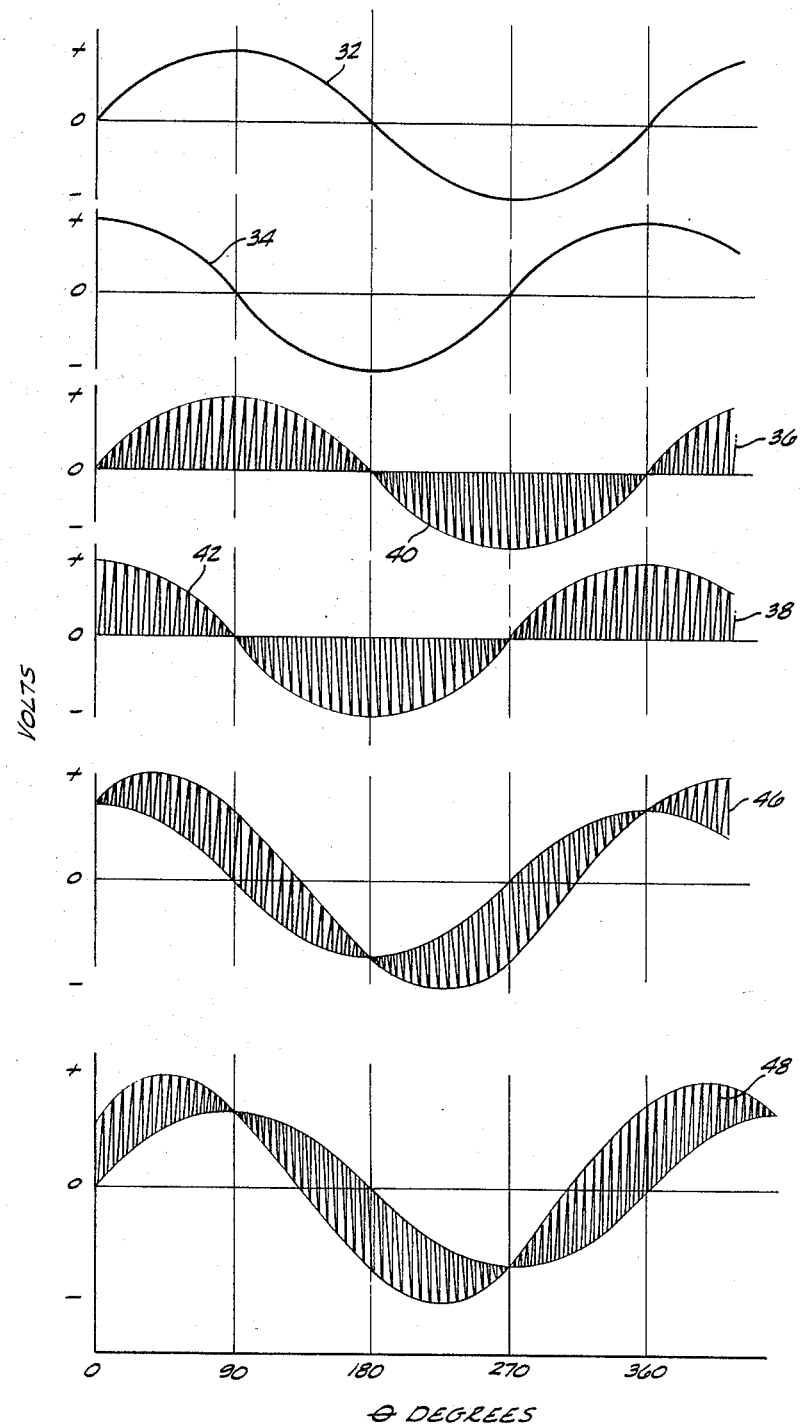
FIG. 7 is a graph of voltage waveforms at various points in the voltage generator according to the embodiment of FIG. 1 utilized for full PPI operation in a cathode ray storage tube.

To explain the operation of the voltage generator of FIG. 1, reference will now be made to FIG. 7. Assuming appropriate values for the resistor 10 and the capacitor 12 (FIG. 5), the first and second sweep generators 6, 8 are responsive to first and second signal voltages having respective first and second waveforms 32, 34 respectively representative of equal amplitude sine and cosine functions of an angle continuously varying with time between predetermined limits for respectively providing first and second sweep carrier voltages of third and fourth waveforms 36, 38 respectively. The envelope 40 of the third waveform 36 bears the same relationship to the envelope 42 of the fourth waveform 38 as the first waveform 32 bears to the second waveform 34, namely, they are equal amplitude sine and cosine functions, respectively, of an angle continuously varying with time between predetermined limits. The angle, designated $\theta$, may, for example, be that between the direction of view of a radar antenna and a convenient reference direction, and the predetermined limits may be zero and infinity, as in the case of a continuously unidirectionally rotating antenna. Such rotation may be represented by the graph 44 of a linear function of time shown in FIG. 6.

The pedestal generator 18 drives the first switched clamp 14, alternately permitting capacitor 12 to charge and then effectively shorting it, thus permitting the first sweep carrier voltage waveform 36 to build up and then rapidly returning it to the fixed reference level, ground, before the beginning of each successive sweep thereof. Similarly, the pedestal generator 18 drives the second switched clamp 16 to bring the second sweep carrier voltage waveform 38 back to the same reference level before the beginning of each successive sweep thereof.

In response to the first sweep carrier voltage of waveform 36 and the second signal voltage of waveform 34, the first summing means 20 provides a first offset sweep carrier voltage of waveform 46 which is representative of the algebraic sum of waveform 36 and waveform 34 and which may be applied to a utilization device by way of the terminal pair 28. Similary, in response to the second sweep carrier voltage of waveform 38 and the first signal voltage of waveform 32, the second summing means 22 provides a second offset sweep carrier voltage of waveform 48 which is representative of the algebraic sum of waveform 38 and waveform 32 and which may be applied to a utilization device by way of the terminal pair 30.

It will be appreciated that the first sweep carrier voltage waveform 36, the second sweep carrier voltage waveform 38, the first offset sweep carrier voltage waveform 46, and the second offset sweep carrier voltage waveform 48 may respectively be represented by the following mathematical equations:

$$S_{1H} = f_1(t) \sin \theta \qquad (1)$$
$$S_{1V} = f_1(t) \cos \theta \qquad (2)$$
$$S_{2H} = f_2(t) \sin \theta + K \cos \theta \qquad (3)$$
$$S_{2V} = f_2(t) \cos \theta + K \sin \theta \qquad (4)$$

Figure 3:
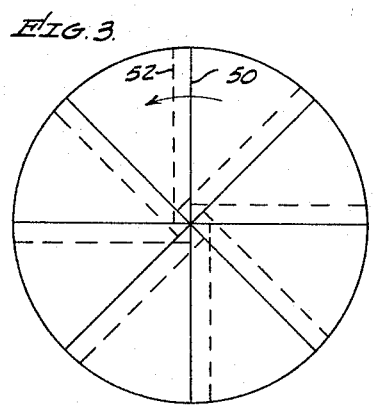
FIG. 3 is a diagram of an electron beam impingement pattern on a storage target or a visual display on a display screen of a cathode ray storage tube of the kind described above which may be achieved by utilizing a voltage generator according to the present invention to develop vertical and horizontal deflection voltages for the tube operating in full PPI mode.

However, Equations 1 and 2 may also represent the horizontal and vertical components, respectively, of the locus of a first PPI scan in a cathode ray tube, $f_1(t)$ representing range, and $\theta$ being defined from a vertical reference on the storage target or display screen. In addition, Equations 3 and 4 may represent the horizontal and vertical components, respectively, of the locus of a second electron beam scan maintaining a predetermined parallel relationship with the locus of the first scan, the magnitude of the factor K determining the size of the offset between the two scans and its sign determining the direction in which the second scan is offset from the first. Hence, if desired, the first and second sweep carrier voltages of third and fourth waveforms 36, 38 may respectively be applied to the horizontal and vertical write deflection amplifiers of a cathode ray storage tube of the type described hereinabove and the first and second offset sweep carrier voltages of waveforms 46, 48 may respectively be applied to the horizontal and vertical erase deflection amplifiers of the same tube to provide an electron beam impingement pattern as shown in FIG. 3, wherein successive rotating write beam scanning loci are shown by the solid lines 50, and the corresponding erase beam scanning loci spatially preceding the solid lines 50 are shown by the dotted lines 52.

It will be noted from the equations set forth above that there are two explicit functions of time, $f_1(t)$ and $f_2(t)$, which may represent the sweep frequency of the write and erase scans. While $f_2(t)$, the erase scan frequency, may be identical with $f_1(t)$, the write scan frequency, it may also be different therefrom. To provide different erase and write scanning frequencies, the voltage generator of FIG. 1 may be altered by coupling two additional sweep generators of a frequency different from that of the first and second sweep generators 6, 8, one to each of the first and second terminal pairs 2, 4, and coupling the third and fourth terminal pairs 24, 26 to the additional sweep generators rather than to the first and second sweep generators 6, 8. A voltage generator according to the present invention and having substantially such an arrangement is shown in FIG. 2.

Referring further to FIG. 2, it will be seen that a portion of the voltage generator depicted therein is substantially the same as the entire voltage generator of FIG. 1. Thus, FIG. 2 shows first and second sweep generators 6, 8; first and second switched clamps 14, 16 coupled thereto, respectively; a first pedestal generator 18 coupled to the first and second switched clamps 14, 16; and first and second summing means 20, 22 respectively coupled to the first and second sweep generators 6, 8. The first, second, fifth, and sixth terminal pairs 2, 4, 28, 30 are not shown directly, as in FIG. 1; instead, a source of signal voltages and a portion of a utilization device are shown, and the first and second sweep generators 6, 8 are shown coupled to the former, the first and second summing means 20, 22 being shown coupled to the latter.

Third and fourth sweep generators 54, 56, the "additional sweep generators" adverted to above, are shown coupled to the source of signal voltages mentioned above. That source, designated a sine-cosine function generator 58, may be a sine-cosine resolver 60 (FIG. 5) or potentiometer coupled to a source of fixed direct current potential, such as the battery 62 (FIG. 5). Third and fourth switched clamps 64, 66 are coupled to the third and fourth sweep generators 54, 56, respectively, and a second pedestal generator 68 is coupled to the third and fourth switched clamps 64, 66.

To establish the magnitude and sign of the factor K appearing in Equations 3 and 4 and also mentioned above as determining the magnitude and direction of the parallel offset between write and erase scans, first and second inverter-scalers 70, 72 are coupled to the sine-cosine function generator 58, first and second by-pass switches 74, 76, each with a movable arm, are coupled to the first and second inverter-scalers 70, 72, respectively, and the movable arms of the first and second by-pass switches 74, 76 are coupled to the second and first summing means 22, 20, respectively. Operational amplifiers which may be utilized as inverters-scalers are discussed by Millman and Taub, op. cit., pp. 22–25.

A portion of a utilization device is shown in FIG. 2, consisting of horizontal and vertical write beam deflection amplifiers 77, 81 and corresponding deflection plates 78, 80, 82, 84, and further consisting of horizontal and vertical erase beam deflection amplifiers 85, 89 and corresponding deflection plates 86, 88, 90, 92 in a cathode ray storage tube (not shown) of the type mentioned hereinabove. The horizontal write beam deflection amplifier 77 is coupled to the third sweep generator 54; the vertical write beam deflection amplifier 81 is coupled to the fourth sweep generator 56; the horizontal erase beam deflection amplifier is coupled to the first summing means 20; and the vertical erase beam deflection amplifier 89 is coupled to the second summing means 22. The horizontal write beam deflection plates 78, 80 are coupled to the horizontal write beam deflection amplifier 77; the vertical write beam deflection plates 82, 84 are coupled to the vertical write beam deflection amplifier 81; the horizontal erase beam deflection plates 86, 88 are coupled to the horizontal erase beam deflection amplifier 85; and the vertical erase beam deflection plates 90, 92 are coupled to the vertical erase beam deflection amplifier 89.

To explain the operation of the voltage generator of FIG. 2, reference is made to FIG. 9. Assuming that the angle $\theta$, which may represent the angle between the direction of view of a radar antenna and a reference direction, varies continuously between predetermined finite limits such as $+60°$ and $-60°$, then its variation may be represented by the graph 94 of a linear function of time shown in FIG. 8, and the voltage signals provided by the sine-cosine function generator 58 may be represented by the two waveforms 96, 98 which are, respectively, equal amplitude functions of sine $\theta$ and cosine $\theta$ continuously varying between the predetermined limits. When a signal voltage of waveform 96 is applied to the first and third sweep generators 6, 54 and a signal voltage of waveform 98 is applied to the second and fourth sweep generators 8, 56, the first sweep generator 6 provides a sweep carrier voltage of waveform 100 having an envelope substantially identical to waveform 96, the third sweep generator 54 provides a sweep carrier voltage of a similar waveform (not shown) having a frequency different from that of waveform 100 but a substantially identical envelope, the second sweep generator 8 provides a sweep carrier voltage of waveform 102 having an envelope substantially identical to waveform 98, and the fourth sweep generator 56 provides a sweep carrier voltage of a similar waveform (not shown) having a frequency different from that of waveform 102 but a substantially identical envelope. The two sweep carrier voltages of waveform 100, 102 and the two not shown return to a point of fixed reference potential before the beginning of each successive sweep thereof because of the action of the four switched clamps 14, 16, 64, 66 driven by the two pedestal generators 18, 68 as explained above in connection with the operation of the voltage generator of FIG. 1.

A first offsetting voltage of waveform 104 proportional to the signal voltage of waveform 98 is provided by the second inverter-scaler 72 in response to a signal voltage of waveform 98. It will be noted that the waveform 104 is proportional to the waveform 98 and that its polarity is the same as that of waveform 98 whenever the nonreference side of the angle $\theta$ proceeds in one direction with respect to the reference side of the angle $\theta$ but is inverted with respect to waveform 98 whenever the nonreference side proceeds in the opposite direction. This result may be achieved with an inverter-scaler and switch arrangement such as that shown in FIG. 5, wherein the second inverter-scaler 72 includes first and second operational amplifiers 106, 108, the first to scale the signal voltage of waveform 98 and the second to invert the voltage output of the first. Selective operation of the movable arm of the second switch 76 then provides the first offsetting voltage of waveform 104 to the first summing means 20 which is coupled thereto.

Inasmuch as the first summing means 20 is also coupled to the first sweep generator 6, it additionally receives the sweep carrier voltage of waveform 100 and provides the offset sweep carrier voltage of waveform 110 representative of the algebraic sum of the first offsetting voltage of waveform 104 and a sweep carrier voltage of waveform 100. The dotted line 112, which represents the nonoffset envelope of waveform 100 is shown to aid comparison therewith.

A second offsetting voltage of waveform 114 proportional to the signal voltage of waveform 96 is provided by the first inverter-scaler 70 in response to a signal voltage of waveform 96. Again it will be noted that the waveform 114 is proportional to the waveform 96 and that it has the same polarity as waveform 96 whenever the nonreference side of the angle $\theta$ proceeds in one direction with respect to the reference side of $\theta$ but is inverted with respect to waveform 98 whenever the nonreference side of $\theta$ proceeds in the opposite direction. This result may be achieved with an arrangement of the first inverter-scaler 70 and the first switch 74 such as that shown in FIG. 5, the arrangement being the same as that of the second inverter-scaler 72 and the second switch 76. Selective operation of the movable arm of the first switch 74 then provides the second offsetting voltage of waveform 114 to the second summing means 22 which is coupled thereto.

Inasmuch as the second summing means 22 is also coupled to the second sweep generator 8, it additionally receives the sweep carrier voltage of waveform 102 and provides the offset sweep carrier voltage of waveform 116 representative of the algebraic sum of the second offsetting voltage of waveform 114 and a sweep carrier voltage of waveform 102. The dotted line 118, which represents the nonoffset envelope of waveform 102, is shown to aid in a comparison.

Figure 4:
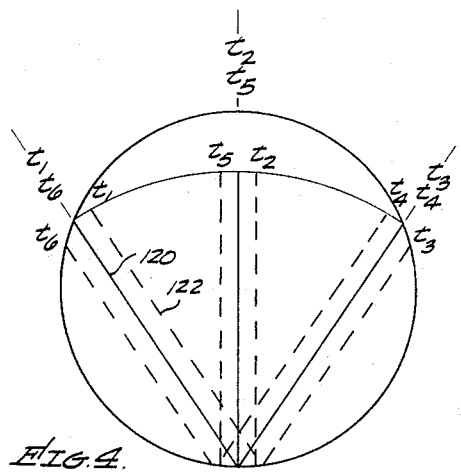
FIG. 4 is a diagram of another electron beam impingement pattern or visual display on a storage target or a display screen of a similar cathode ray storage tube which may be achieved by utilizing a voltage generator according to the present invention to develop vertical and horizontal deflection voltages for the tube operating in sector PPI mode.

Application of the sweep carrier voltages developed by the third and fourth sweep generators 54, 56 in response to the signal voltages of waveforms 96, 98 to the horizonal and vertical write deflection amplifiers 77, 81, and application to the horizontal and vertical erase deflection amplifiers 85, 89 of the offset sweep carrier voltages provided by the first and second summing means 20, 22 in response the sweep carrier voltages and offsetting voltages derived, as described above, from the same signal voltages, result in a sector PPI impingement pattern of write and erase electron beams as shown in FIG. 4. The solid lines 120 there represent successive write beam scanning loci, and the dotted lines 122 represent successive erase beam scanning loci, the write beam scan rotating within finite limits with a reciprocating motion like a windshield wiper, and the erase beam scan spatially preceding the write beam at all times, as shown by matching the subscripts of the timing symbols, $t$.

FIG. 5, having been utilized for a better understanding of the voltage generators of FIGS. 1 and 2, will not be further discussed.

There has thus been shown a voltage generator responsive to equal amplitude sine and cosine functions of an angle varying continuously with time between predetermined limits for providing four sweep carrier voltages whose envelopes and reference levels are such as to make them useful for application as write and erase beam deflection voltages, for example, the responsiveness of the generator to relatively low frequency voltages making it advantageous in applications where the transmission lines between signal source and voltage generator must be relatively long.

What is claimed is:

1. A voltage generator comprising:
   first and second coupling means for receiving signal voltages;
   first and second sweep generators respectively coupled to said first and second coupling means and respectively responsive to first and second signal voltages having respective first and second waveforms respectively representative of equal amplitude sine and cosine functions of an angle continuously varying with time between predetermined limits for respectively providing first and second sweep carrier voltages respectively having envelopes bearing the same relationship to each other as said first and second waveforms;
   a pedestal generator;
   first and second switched clamps coupled between said pedestal generator and, respectively, said first and second sweep generators and energized by said pedestal generator for returning said sweep carrier voltages to a predetermined reference level before the beginning of each successive sweep thereof;
   first summing means coupled to said first sweep generator and said second coupling means for providing a first offset sweep carrier voltage representative of the algebraic sum of said first sweep carrier voltage and said second signal voltage;
   second summing means coupled to said second sweep generator and said first coupling means for providing a second offset sweep carrier voltage representative of the algebraic sum of said second sweep carrier voltage and said first signal voltage; and
   third, fourth, fifth and sixth coupling means respectively coupled to said first sweep generator, said second sweep generator, said first summing means, and said second summing means for respectively applying said first sweep carrier voltage, said second sweep carrier voltage, said first offset sweep carrier voltage, and said second offset sweep carrier voltage to a utilization device.

2. A voltage generator comprising:
   first and second coupling means for receiving signal voltages;
   first and second sweep generators respectively coupled to said first and second coupling means and respectively responsive to first and second signal voltages having respective first and second waveforms respectively representative of equal amplitude sine and cosine functions of an angle continuously varying with time between predetermined limits for respectively providing first and second sweep carrier voltages respectively having envelopes bearing the same relationship to each other as said first and second waveforms;
   third and fourth sweep generators respectively coupled to said first and second coupling means and respectively responsive to said first and second signal voltages for respectively providing third and fourth sweep carrier voltages respectively having envelopes substantially identical to the envelopes of said first and second sweep carrier voltages, respectively, and bearing the same relationships therebetween;
   first and second pedestal generators;
   first and second switched clamps coupled between said first pedestal generator and, respectively, said first and second sweep generators and energized by said first pedestal generator for returning said first and second sweep carrier voltages to a predetermined reference level before the beginning of each successive sweep thereof;
   third and fourth switched clamps coupled between said second pedestal generator and, respectively, said third and fourth sweep generators and energized by said second pedestal generator for returning said third and fourth sweep carrier voltages to said predetermined reference level before the beginning of each successive sweep thereof;
   a first summing network coupled to said first sweep generator and said second coupling means for providing a first offset sweep carrier voltage representative of the algebraic sum of said first sweep carrier voltage and said second signal voltage;
   a second summing network coupled to said second sweep generator and said first coupling means for providing a second offset sweep carrier voltage representative of the algebraic sum of said second sweep carrier voltage and said first signal voltage; and
   third, fourth, fifth, and sixth coupling means respectively coupled to said third sweep generator, said fourth sweep generator, said first summing network, and said second summing network for respectively applying said third sweep carrier voltage, said fourth sweep carrier voltage, said first offset sweep carrier voltage, and said second offset sweep carrier voltage to a utilization device.

3. A voltage generator comprising:
   first and second coupling means for receiving signal voltages;
   first and second sweep generators respectively coupled to said first and second coupling means and respectively responsive to first and second signal voltages having respective first and second waveforms respectively representative of equal amplitude sine and cosine functions of an angle continuously varying with time between predetermined limits for respectively providing first and second sweep carrier voltages respectively having envelopes bearing the same relationship to each other as said first and second waveforms;
   third and fourth sweep generators respectively coupled to said first and second coupling means and respectively responsive to said first and second signal voltages for respectively providing third and fourth sweep carrier voltages respectively having envelopes substantially identical to the envelopes of said first and second sweep carrier voltages, respectively, and bearing the same relationships therebetween;
   first and second pedestal generators;
   first and second switched clamps coupled between said first pedestal generator and, respectively, said first and second sweep generators and energized by said first pedestal generator for returning said first and second sweep carrier voltages to a predetermined reference level before the beginning of each successive sweep thereof;
   third and fourth switched clamps coupled between said second pedestal generator and, respectively, said third and fourth sweep generators and energized by said second pedestal generator for returning said third and fourth sweep carrier voltages to said predetermined reference level before the beginning of each successive sweep thereof;
   first and second inverter-scalers respectively coupled to said first and second coupling means and respectively responsive to said first and second signal voltages for respectively providing first and second offsetting voltages proportional to said first and second signal voltages, respectively, said first and second offsetting voltages respectively being of the same instantaneous polarity as said first and second signal voltages, respectively, and of the opposite polarity, selectively, depending on the rotational direction of one side of said angle with respect to the reference side thereof;
   a first summing network coupled to said first sweep generator and said second inverter-scaler for providing a first offset sweep carrier voltage representative of the algebraic sum of said first sweep carrier voltage and said second offsetting voltage;
   a second summing network coupled to said second sweep generator and said first inverter scaler for providing a second offset sweep carrier voltage representative of the algebraic sum of said second sweep carrier voltage and said first offsetting voltage; and third, fourth, fifth, and sixth coupling means respectively coupled to said third sweep generator, said fourth sweep generator, said first summing network, and said second summing network for respectively applying said third sweep carrier voltage, said fourth sweep carrier voltage, said first offset sweep carrier voltage, and said second offset sweep carrier voltage to a utilization device.

4. A voltage generator comprising:

first and second coupling means for receiving signal voltages;

first and second sweep generators respectively coupled to said first and second coupling means and respectively responsive to first and second signal voltages having respective first and second waveforms respectively representative of equal amplitude sine and cosine functions of an angle continuously varying with time between predetermined limits for respectively providing first and second sweep carrier voltages respectively having envelopes bearing the same relationship to each other as said first and second waveforms;

means coupled to said sweep generators for returning said sweep carrier voltages to a predetermined reference level before the beginning of each successive sweep thereof;

first summing means coupled to said first sweep generator and said second coupling means for providing a first offset sweep carrier voltage representative of the algebraic sum of said first sweep carrier voltage and said second signal voltage;

second summing means coupled to said second sweep generator and said first coupling means for providing a second offset sweep carrier voltage representative of the algebraic sum of said second sweep carrier voltage and said first signal voltage; and third coupling means coupled to said first and second summing means for applying said first and second offset sweep carrier voltages to a utilization device.

5. A voltage generator comprising:

first and second coupling means for receiving signal voltages;

first and second sweep generators respectively coupled to said first and second coupling means and respectively responsive to first and second signal voltages having respective first and second waveforms respectively representative of equal amplitude sine and cosine functions of an angle continuously varying with time between predetermined limits for respectively providing first and second sweep carrier voltages respectively having envelopes bearing the same relationship to each other as said first and second waveforms;

means coupled to said sweep generators for returning said sweep carrier voltages to a predetermined reference level before the beginning of each successive sweep thereof;

first summing means coupled to said first sweep generator and said second coupling means for providing a first offset sweep carrier voltage representative of the algebraic sum of said first sweep carrier voltage and said second signal voltage;

second summing means coupled to said second sweep generator and said first coupling means for providing a second offset sweep carrier voltage representative of the algebraic sum of said second sweep carrier voltage and said first signal voltage;

third coupling means coupled to said first and second sweep generators for applying said first and second sweep carrier voltages to a utilization device; and fourth coupling means coupled to said first and second summing means for applying said first and second offset sweep carrier voltages to a utilization device.

6. A voltage generator comprising:

first and second coupling means for receiving signal voltages;

first and second sweep generators repsectively coupled to said first and second coupling means and respectively responsive to first and second signal voltages having respective first and second waveforms respectively representative of equal amplitude sine and cosine functions of an angle continuously varying with time between predetermined limits for respectively providing first and second sweep carrier voltages respectively having envelopes bearing the same relationship to each other as said first and second waveforms;

means for returning said sweep carrier voltages to a predetermined reference level before the beginning of each successive sweep thereof;

first and second inverter-scalers respectively coupled to said first and second coupling means and respectively responsive to said first and second signal voltages for respectively providing first and second offsetting voltages proportional to said first and second signal voltages, respectively, said first and second offsetting voltages respectively being of the same instantaneous polarity as said first and second signal voltages, respectively, and of the opposite polarity, selectively, depending on the rotational direction of one side of said angle with respect to the reference side thereof;

a first summing network coupled to said first sweep generator and said second inverter-scaler for providing a first offset sweep carrier voltage representative of the algebraic sum of said first sweep carrier voltage and said second offsetting voltage;

a second summing network coupled to said second sweep generator and said first inverter-scaler for providing a second offset sweep carrier voltage representative of the algebraic sum of said second sweep carrier voltage and said first offsetting voltage;

third coupling means coupled to said first and second sweep generator for applying said first and second sweep carrier voltages to a utilization device; and fourth coupling means coupled to said first and second summing means for applying said first and second offset sweep carrier voltages to a utilization device.

References Cited by the Examiner

UNITED STATES PATENTS

| | | | |
|---|---|---|---|
| 2,313,966 | 3/1943 | Poch | 315—24 |
| 2,412,291 | 12/1946 | Schade | 315—24 |
| 2,718,609 | 9/1955 | Covely | 315—24 X |

ARTHUR GAUSS, *Primary Examiner.*

J. S. HEYMAN, *Assistant Examiner.*